US009225967B2

(12) United States Patent
Sohn et al.

(10) Patent No.: US 9,225,967 B2
(45) Date of Patent: Dec. 29, 2015

(54) MULTI-VIEW IMAGE PROCESSING APPARATUS, METHOD AND COMPUTER-READABLE MEDIUM

(75) Inventors: Kwang Hoon Sohn, Seoul (KR); Seok Lee, Yongin-si (KR); Ho Cheon Wey, Seongnam Si (KR); Jung Dong Seo, Namyanglu Si (KR); Dong Hyun Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 794 days.

(21) Appl. No.: 12/929,413

(22) Filed: Jan. 21, 2011

(65) Prior Publication Data

US 2011/0211638 A1    Sep. 1, 2011

(30) Foreign Application Priority Data

Feb. 26, 2010    (KR) .................. 10-2010-0017842

(51) Int. Cl.
*H04N 13/02*    (2006.01)
*H04N 13/00*    (2006.01)
(Continued)

(52) U.S. Cl.
CPC ....... *H04N 13/0271* (2013.01); *H04N 13/0003* (2013.01); *H04N 13/004* (2013.01); *H04N 13/0007* (2013.01); *H04N 13/0014* (2013.01); *H04N 13/0018* (2013.01); *H04N 13/0022* (2013.01); *H04N 13/02* (2013.01); *H04N 13/0203* (2013.01); *H04N 13/0207* (2013.01); *H04N 19/56* (2014.11); *H04N 19/597* (2014.11); *G06T 7/0051* (2013.01); *G06T 7/0065* (2013.01); *G06T 7/0071* (2013.01); *G06T 7/0075* (2013.01);
(Continued)

(58) Field of Classification Search
CPC .......... H04N 13/0018; H04N 13/0022; H04N 13/004; H04N 13/0048; H04N 13/0207; H04N 13/0271; H04N 2013/0081; H04N 2013/0085; G06T 7/0057; G06T 7/0065; G06T 7/0071
USPC ...................................... 348/43; 375/240.16
See application file for complete search history.

(56) References Cited

U.S. PATENT DOCUMENTS 5,612,735 A * 3/1997 Haskell et al. ................. 348/43
6,055,274 A * 4/2000 McVeigh ................. 375/240.16
(Continued)

FOREIGN PATENT DOCUMENTS

JP      10-191394       7/1998
JP      2007-166381     6/2007
(Continued)

OTHER PUBLICATIONS

ITU-T Recommendation H.262 (MPEG-2 Part 2: Video) (Jul. 1995).*
(Continued)

*Primary Examiner* — Dave Czekaj
*Assistant Examiner* — David N Werner
(74) *Attorney, Agent, or Firm* — Staas & Halsey LLP (57) ABSTRACT

Provided is an image processing apparatus, method and computer-readable medium. When encoding a multi-view color and depth video, a motion vector calculator of the image processing apparatus may calculate a block motion vector with respect to a first viewpoint color image. A motion vector borrowing unit may borrow, as a block motion vector with respect to a second viewpoint color image, a block motion vector with respect to the first viewpoint color image based on a disparity calculated from a depth video.

3 Claims, 12 Drawing Sheets

(51) Int. Cl.
*H04N 19/56* (2014.01)
*H04N 19/597* (2014.01)
*G06T 7/00* (2006.01)

(52) U.S. Cl.
CPC ...... *H04N 13/025* (2013.01); *H04N 2013/0077* (2013.01); *H04N 2013/0081* (2013.01); *H04N 2013/0085* (2013.01)

(56) References Cited

U.S. PATENT DOCUMENTS

| | | | |
|---|---|---|---|
| 7,561,620 B2 | 7/2009 | Winder et al. | |
| 2001/0014171 A1* | 8/2001 | Iijima et al. | 382/154 |
| 2002/0196415 A1* | 12/2002 | Shiratani | G01B 11/25 353/31 |
| 2007/0147502 A1* | 6/2007 | Nakamura | 375/240.12 |
| 2008/0031327 A1* | 2/2008 | Wang et al. | 375/240.12 |
| 2008/0285654 A1 | 11/2008 | Cai et al. | |
| 2010/0007717 A1* | 1/2010 | Spektor et al. | 348/43 |
| 2011/0285701 A1* | 11/2011 | Chen | G06K 9/4638 345/419 |

FOREIGN PATENT DOCUMENTS

| | | |
|---|---|---|
| JP | 2007-180981 | 7/2007 |
| JP | 2009-164865 | 7/2009 |
| JP | 4355914 | 8/2009 |
| JP | 2009-522986 | 11/2009 |
| KR | 10-2007-0083168 | 8/2007 |
| KR | 10-0789753 | 12/2007 |
| KR | 10-2008-0078697 | 8/2008 |
| KR | 10-2009-0002412 | 1/2009 |
| KR | 10-2009-0053821 | 5/2009 |
| KR | 10-2009-0111833 | 10/2009 |
| KR | 10-2009-0130712 | 12/2009 |
| WO | WO 2007081926 A2 * | 7/2007 |
| WO | 2009/091383 | 7/2009 |

OTHER PUBLICATIONS

T. Tzovaras, N. Grammalidis, & M.G. Strintzis, "Object-Based Coding of Stereo Image Sequences using Joint 3-D Motion/Disparity Compensation", 7 IEEE Trans. on Circuits & Sys. for Video Tech. 312-327 (Apr. 1997).*

B. Adikari, W.A.C. Fernando, & H.K. Arachichi, "A New Motion and Disparity Vector Prediction Technique for H.264 Based Stereoscopic Coding", Proc. of the 2006 IEEE Int'l Symposium on Circuits & Sys. (ISCAS 2006) 930-933.*

T.D.A. Prasad, K. Hartmann, W. Weihs, S.E. Ghobadi, & A. Sluiter, "First steps in enhancing 3D vision technique using 2D/3D sensors", presented at Czech Pattern Recognition Society Computer Vision Winter Workshop 2006 (Feb. 2006).*

J. Zhu, L. Wang, R. Yang, & J. Davis, "Fusion of Time-of-Flight Depth and Stereo for High Accuracy Depth Maps", 2008 IEEE Conf. on Comp. Vision & Pattern Recognition (CVPR 2008) 1 (Jun. 2008).*

C. Beder, B. Bartczak, & R. Koch, "A Comparison of PMD-Cameras and Stereo-Vision for the Task of Surface Reconstruction using Patchlets", 2007 IEEE Conf. on Comp. Vision & Pattern Recognition (CVPR 2007) 1 (Jun. 2007).*

R. Reulke, "Combinattion of Distance Data with High Resolution Images" (Jan. 2006).*

S.Á. Guðmundsson, H. Aanæs, & R. Rasen, "Fusion of Stereo Vision and Time-of-Flight Imaging for Improved 3D Estimation", 5 Int'l J. of Intelligent Sys. Tech. & Applications 425-433 (Nov. 2008).*

K. Kuhnert & M. Stommel, "Fusion of Stereo-Camera and PMD-Camera Data for Real-Time Suited Precise 3D Environment Reconstruction", 2006 IEEE/RSJ Int'l Conf. on Intelligent Robots & Sys. 4780-85 (Oct. 2006).*

* cited by examiner

MULTI-VIEW IMAGE PROCESSING APPARATUS, METHOD AND COMPUTER-READABLE MEDIUM

CROSS-REFERENCE TO RELATED APPLICATIONS

This application claims the priority benefit of Korean Patent Application No. 10-2010-0017842, filed on Feb. 26, 2010, in the Korean Intellectual Property Office, the disclosure of which is incorporated herein by reference.

BACKGROUND

1. Field

Example embodiments relate to encoding and decoding of a multi-view video, and more particularly, to encoding of a multi-view color and depth video.

2. Description of the Related Art

To configure a three-dimensional (3D) video system beyond a stereo scheme, a multi-view video may be obtained by photographing the same scene from a plurality of viewpoints.

In particular, in a free viewpoint 3D video system, when a color video and a depth video are obtained from each of a plurality of viewpoints, bandwidth of data may significantly increase. Accordingly, an effective encoding process may be needed.

When individually obtaining a motion vector between frames with respect to each of a plurality of macro blocks within the color video photographed from each of the plurality of viewpoints, an amount of calculations may significantly increase.

Accordingly, for example, in addition to an existing video encoding process, there are an intra prediction, a motion estimation and compensation, and a disparity estimation and compensation. Thus, there is a desire for an effective encoding process for a multi-view color and depth video.

SUMMARY

The foregoing and/or other aspects are achieved by providing an image processing apparatus encoding a multi-view color and depth video, including a motion vector calculator to calculate a motion vector of each of a plurality of blocks within a color video of a first viewpoint, a disparity calculator to calculate a disparity vector between the first viewpoint and a second viewpoint with respect to a first block within a color video of the second viewpoint, by referring to a depth video of the second viewpoint, and a motion vector borrowing unit to borrow, as a motion vector of the first block, a motion vector of at least one block among the plurality of blocks within the color video of the first viewpoint, by referring to the disparity vector.

The motion vector borrowing unit may determine a first area within the color video of the first viewpoint by applying the disparity vector to the first block, and may borrow, as the motion vector of the first block, a motion vector of at least one block within the color video of the first viewpoint including at least one portion of the first area.

When at least two blocks within the color video of the first viewpoint include the at least one portion of the first area, the motion vector borrowing unit may divide the first block into at least two sub-blocks, and may borrow, as a motion vector of each of the at least two sub-blocks, a motion vector of a block within the color video of the first viewpoint corresponding to each of the at least two sub-blocks.

The disparity calculator may calculate the disparity vector based on a depth value corresponding to the first block and a distance between the first viewpoint and the second viewpoint.

The motion vector borrowing unit may determine a second area within the color video of the first viewpoint corresponding to a second block of the depth video of the first viewpoint, and may borrow, as a motion vector of the second block, a motion vector of at least one block within the color video of the first viewpoint including at least one portion of the second area.

When at least two blocks within the color video of the first viewpoint include the at least one portion of the second area, the motion vector borrowing unit may divide the second block into at least two sub-blocks, and may borrow, as a motion vector of each of the at least two sub-blocks, a motion vector of a block within the color video of the first viewpoint corresponding to each of the at least two sub-blocks.

The foregoing and/or other aspects are achieved by providing an image processing apparatus encoding a color and depth video, including a motion vector calculator to calculate a motion vector of each of a plurality of blocks within a color video, and a motion vector borrowing unit to determine a first area within the color video corresponding to a first block of a depth video, and to borrow, as a motion vector of the first block, a motion vector of at least one block within the color video including at least one portion of the first area.

When at least two blocks within the color video include the at least one portion of the first area, the motion vector borrowing unit may divide the first block into at least two sub-blocks and may borrow, as a motion vector of each of the sub-blocks, a motion vector of a block within the color video corresponding to each of the at least two sub-blocks.

The foregoing and/or other aspects are achieved by providing an image processing apparatus encoding a multi-view depth video, including a motion vector calculator to calculate a motion vector of each of a plurality of blocks within a depth video of a first viewpoint, a disparity calculator to calculate a disparity vector between the first viewpoint and a second viewpoint with respect to a first block within a depth video of the second viewpoint, and a motion vector borrowing unit to borrow, as a motion vector of the first block, a motion vector of at least one block among the plurality of blocks within the depth video of the first viewpoint, by referring to the disparity vector.

The foregoing and/or other aspects are achieved by providing an image processing method of encoding a multi-view color and depth video, including calculating, by at least one processor, a motion vector of each of a plurality of blocks within a color video of a first viewpoint, calculating, by the at least one processor, a disparity vector between the first viewpoint and a second viewpoint with respect to a first block within a color video of the second viewpoint, by referring to a depth video of the second viewpoint, and borrowing by the at least one processor, as a motion vector of the first block, a motion vector of at least one block among the plurality of blocks within the color video of the first viewpoint, by referring to the disparity vector.

The foregoing and/or other aspects are achieved by providing an image processing method of encoding a color and depth video, including calculating, by at least one processor, a motion vector of each of a plurality of blocks within a color video, determining, by the at least one processor, a first area within the color video corresponding to a first block of a depth video, and borrowing by the at least one processor, as a motion vector of the first block, a motion vector of at least one block within the color video including at least one portion of the first area.

The foregoing and/or other aspects are achieved by providing a method, including calculating, by at least one processor, a motion vector for each of a plurality of blocks within a color video according to a first viewpoint, determining, by the at least one processor, a variation between the motion vector of a first block within the color video according to the first viewpoint and a motion vector of the first block within the color video according to a second viewpoint, the variation determined by using a depth video according to the second viewpoint; and borrowing, by the at least one processor, the motion vector of the first block within the color video according to the first viewpoint responsive to the variation.

According to another aspect of one or more embodiments, there is provided at least one computer readable medium including computer readable instructions that control at least one processor to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. The embodiments are described below to explain the present disclosure by referring to the figures.

Figure 1:
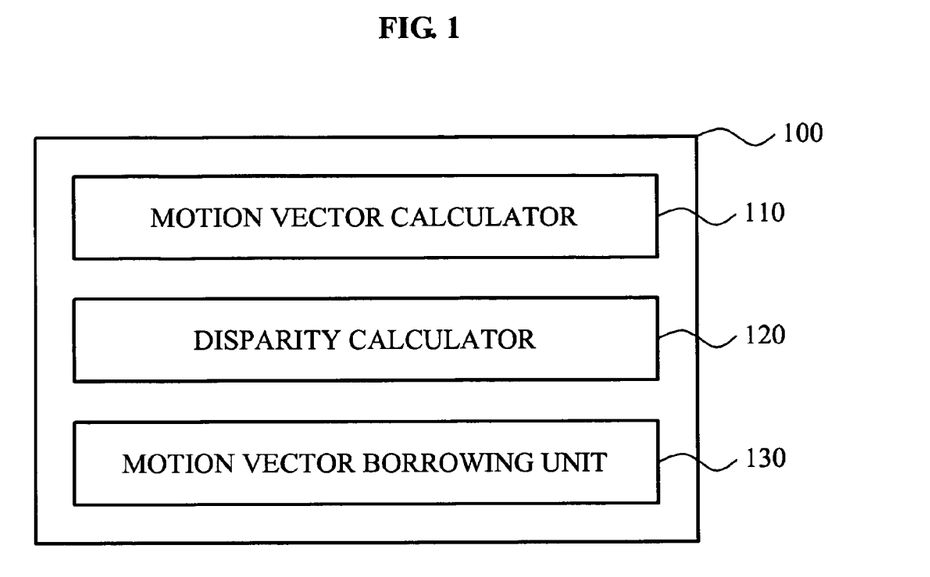
FIG. 1 illustrates an image processing apparatus according to example embodiments.

FIG. 1 illustrates an image processing apparatus 100 according to example embodiments.

Figure 2:
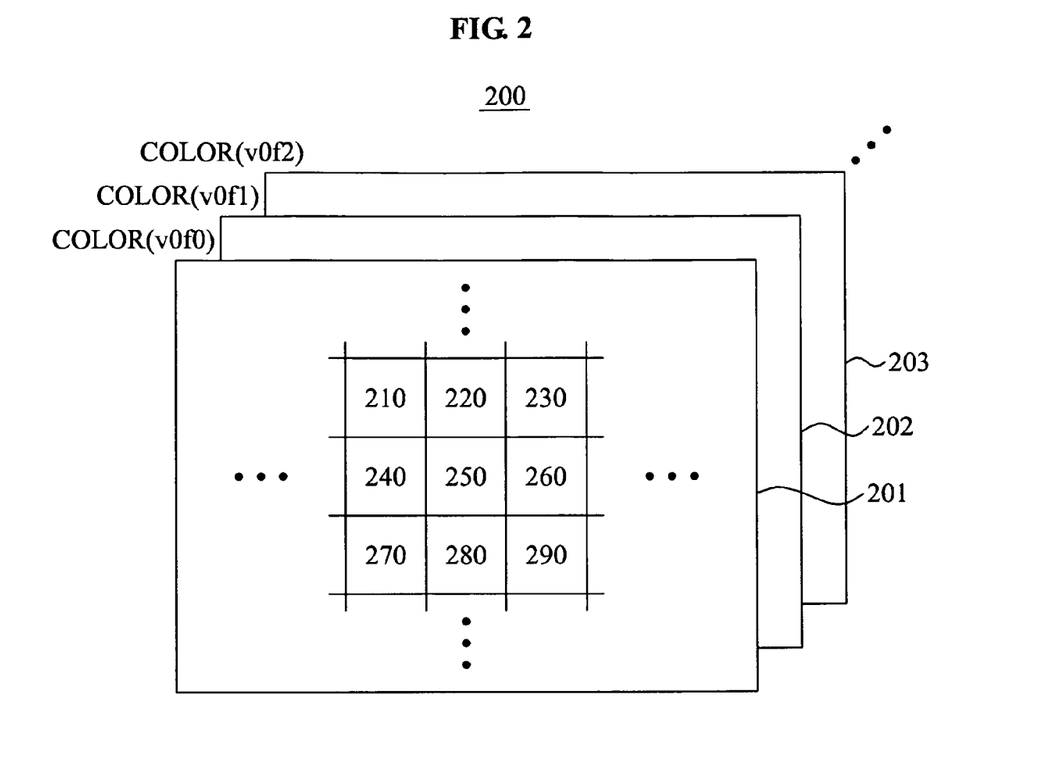
FIG. 2 illustrates a first viewpoint color video in which a motion vector with respect to each block is calculated in advance according to example embodiments.

A motion vector calculator 110 may calculate a motion vector of each of a plurality of blocks of a first viewpoint color video 200 of FIG. 2. The motion vector may be calculated using general encoding schemes. As an example, the first viewpoint color video 200 corresponds to a color video of a first viewpoint.

Figure 3:
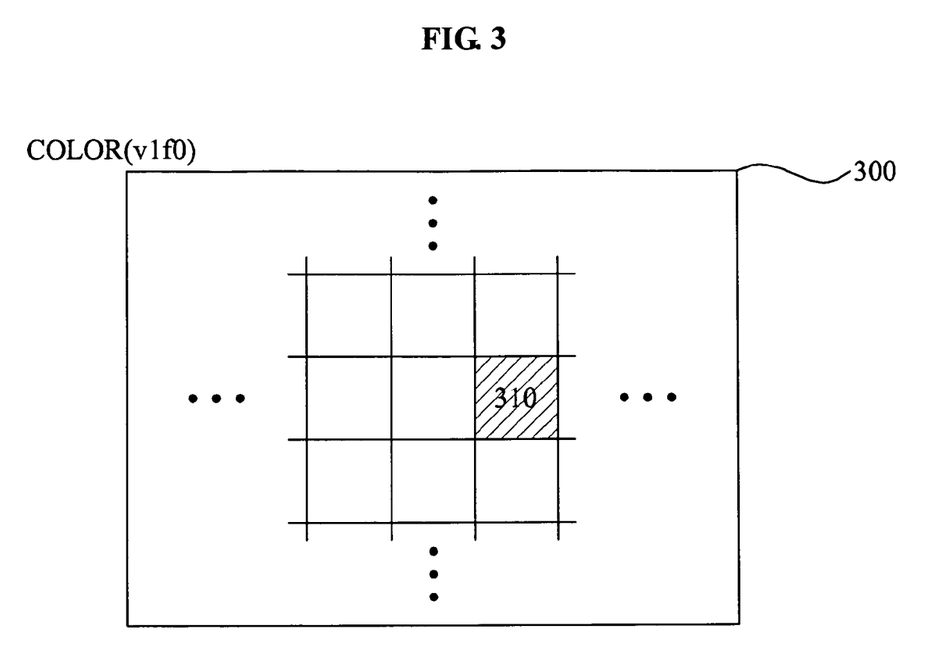
FIG. 3 illustrates a second viewpoint color video to borrow a block motion vector from a first viewpoint color video according to example embodiments.

However, the motion vector calculated with respect to each of the blocks of the first viewpoint color video 200 may be borrowed as a motion vector of a first block 310 of a second viewpoint color video 300 of FIG. 3, and thereby be determined as the motion vector of the first block 310. As an example, the second viewpoint color video 300 corresponds to a color video of a second viewpoint.

In this case, a disparity calculator 120 may obtain a depth value of the first block 310 from a depth video, and calculate a disparity between the first viewpoint and the second viewpoint using the depth value of the first block 310.

A motion vector borrowing unit 130 may determine a first area corresponding to the first block 310 within the first viewpoint color video 200 by applying the calculated disparity.

The motion vector borrowing unit 130 may determine at least one block including at least one portion of the first area among a plurality of blocks within the first viewpoint color image 200.

A motion vector calculation result with respect to the determined at least one block may be borrowed as the motion vector of the first block 310.

Hereinafter, example embodiments of applying, to a block of a second viewpoint color video, a motion vector calculation result with respect to blocks of a first viewpoint color video, example embodiments of applying, to a block of a first viewpoint depth video, a motion vector calculation result with respect to blocks of the first viewpoint color video, and example embodiments of applying, to a block of a second viewpoint depth video, a motion vector of the block of the first viewpoint depth video will be described. As an example, the motion vector of the block of the first viewpoint depth video may be directly calculated or may be borrowed from a color video.

FIG. 2 illustrates the first viewpoint color video 200 in which a motion vector with respect to each block is calculated in advance according to example embodiments.

The first viewpoint color video 200 may include a plurality of frames according to a predetermined time. For example, the first viewpoint color video 200 may include a first frame color video 201 Color(v0f0) of the first viewpoint, a second frame color video 202 Color(v0f1), and a third frame color video 203 Color(v0f2).

The motion vector calculator 110 may calculate a motion vector between frames with respect to a plurality of macro blocks (hereinafter, referred to as "block") within the first viewpoint color video 200.

For example, the motion vector calculator 110 may calculate a motion vector with respect to each of the plurality of blocks including blocks 210, 220, 230, 240, 250, 260, 270, 280, and 290 within the first frame color video 201 Color (V0f0) of the first viewpoint color video 200. The motion vector may be calculated using an existing video encoding process.

At least one portion of motion vectors calculated with respect to the plurality of blocks including the blocks 210, 220, 230, 240, 250, 260, 270, 280, and 290 may be borrowed as a block motion vector of a color video of a second viewpoint. As an example, the second viewpoint may be different from the first viewpoint.

Additionally, borrowing the motion vector will be further described later.

FIG. 3 illustrates the second viewpoint color video 300 to borrow a block motion vector from a first viewpoint color video according to example embodiments.

As an example, a process of determining a motion vector of the first block 310 within the second viewpoint color video 300 will be described. Within an image, the first block 310 of the second viewpoint color video 300 corresponds to the same location as the block 260 within the first viewpoint color video 200.

However, since a location of the first viewpoint is different from a location of the second viewpoint, a disparity may exist between the first viewpoint and the second viewpoint. Accordingly, the motion vector of the first block 310 may not be borrowed as is from the motion vector calculated with respect to the block 260.

The disparity calculator 120 may obtain, from a depth video, a depth value corresponding to the first block 310, and calculate the disparity between the first viewpoint and the second viewpoint with respect to the first block 310 based on the obtained depth value. An operation of the disparity calculator 120 will be further described with reference to FIG. 4.

The motion vector borrowing unit 130 may determine an area of the first viewpoint color video 200 corresponding to the first block 310 based on the disparity, and may also determine a block within the first viewpoint color video 200 including the determined area.

A motion vector of blocks including at least one portion of the determined area may be borrowed as the motion vector of the first block 310 of the second viewpoint color video 300. An operation of the motion vector borrowing unit 130 will be further described with reference to FIGS. 5 and 6.

Figure 4:
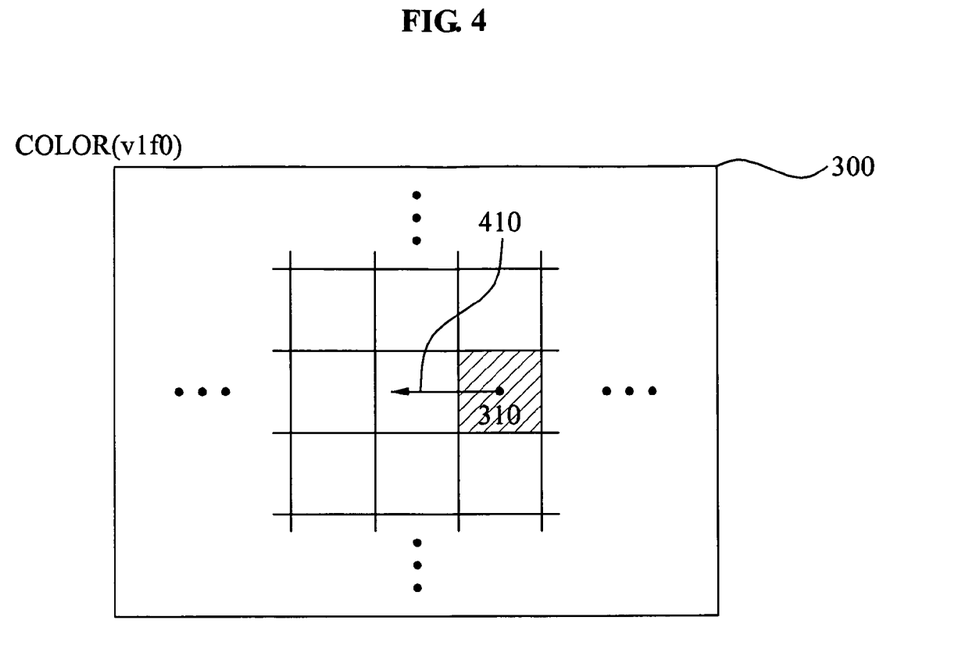
FIG. 4 illustrates a process of calculating a disparity vector of a block within a second viewpoint color video according to example embodiments.

FIG. 4 illustrates a process of calculating a disparity vector 410 of a first block 310 within a second viewpoint color video 300 according to example embodiments.

As a distance between viewpoints increase, a disparity between viewpoints may increase. Also, as a depth value decreases, and as a corresponding image becomes closer to a viewpoint, the disparity may increase.

The distance between the viewpoints may be calculated using a camera parameter. The depth value may be calculated from a second viewpoint depth video (not shown) matched with the second viewpoint color video 300.

The disparity may be calculated using a general calculation scheme. The disparity calculation may be variously modified depending on a given camera parameter, a location between the viewpoints, and the like.

When the calculated disparity vector 410 is applied to the first block 310, a first area corresponding to the first block 310 may be determined within the first viewpoint color video 200.

Figure 5:
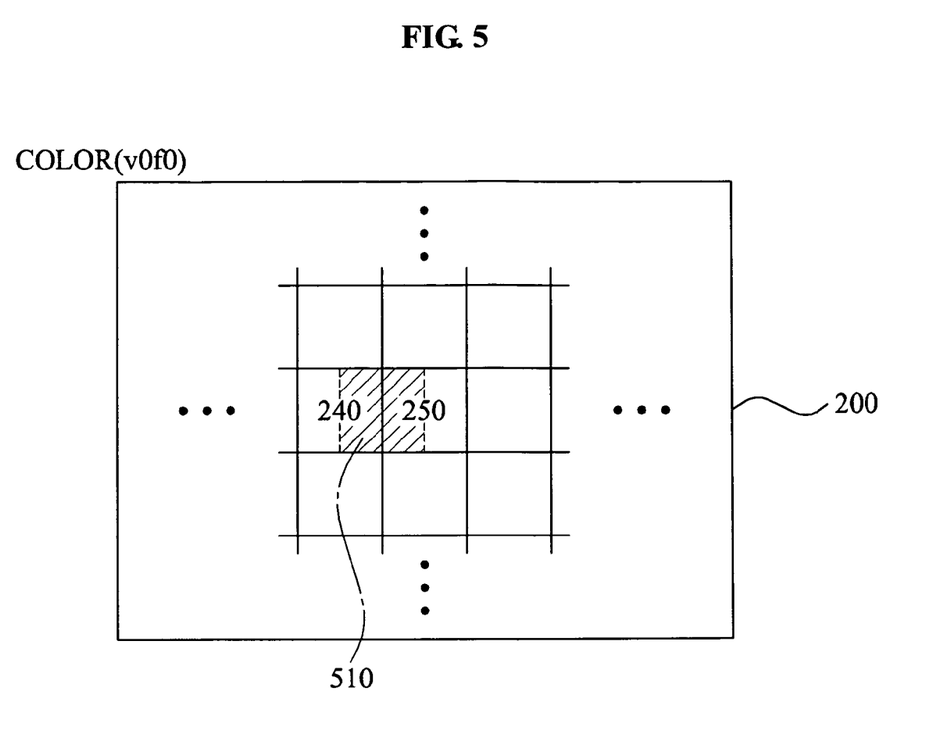
FIG. 5 illustrates a process of determining a block from which a motion vector is to be borrowed according to example embodiments.

FIG. 5 illustrates a process of determining a block from which a motion vector is to be borrowed according to example embodiments.

When a first area 510 corresponding to the first block 310 of FIG. 4 is determined based on the disparity vector 410, a block including at least one portion of the first area 510 may be determined.

In FIG. 5, blocks 240 and 250 within the first viewpoint color video 200 may include the at least one portion of the first area 510.

Accordingly, the motion vector borrowing unit 130 may borrow, as a motion vector of the first block 310 of the second viewpoint color video 300, motion vectors that are pre-calculated by the motion vector calculator 100 with respect to the blocks 240 and 250.

When the first area 510 is included in a single block within the first viewpoint color video 200, a motion vector value of the single block may be borrowed as is. As shown in FIG. 5, when the first area 510 is included in at least two blocks, a motion vector value of a single block among the at least two blocks may not be borrowed as a motion vector value of the first block 310. A processing scheme corresponding to the above case will be described with reference to FIG. 6.

Figure 6:
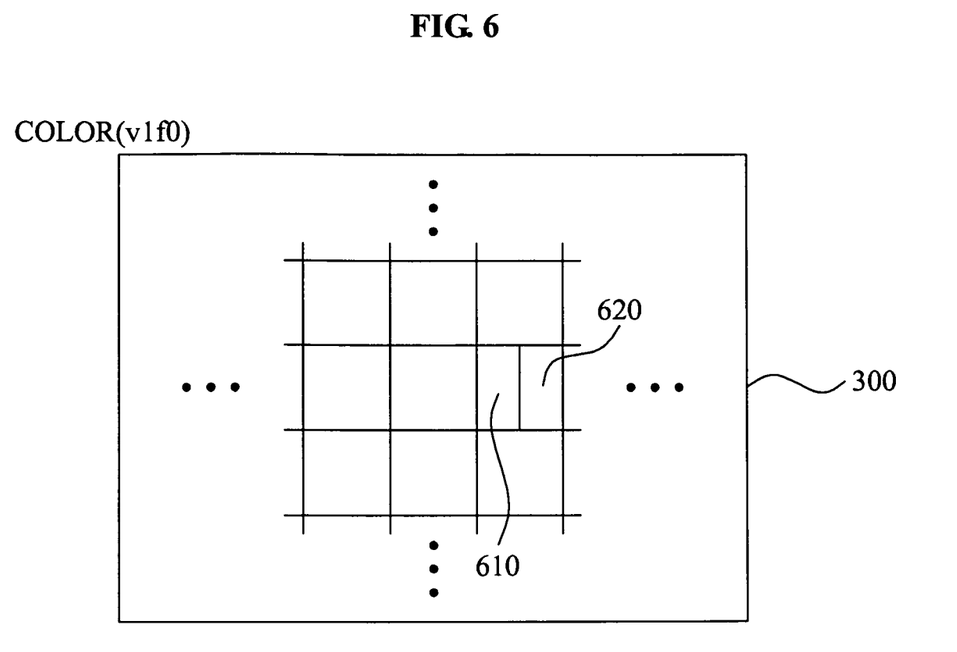
FIG. 6 illustrates a block within a second viewpoint color video divided into a plurality of sub-blocks according to example embodiments.

FIG. 6 illustrates a block within a second viewpoint color video divided into a plurality of sub-blocks according to example embodiments.

When the first area 510 determined to correspond to the first block 310 based on the disparity vector 410 is included in at least two blocks, for example, the blocks 240 and 250 as shown in FIG. 5, the motion vector borrowing unit 130 may divide the first block 310 into at least two sub-blocks, for example, sub-blocks 610 and 620 as shown in FIG. 6.

In the case of the sub-block 610 among the divided at least two sub-blocks, the motion vector borrowing unit 130 may borrow a motion vector from the block 240 of the first viewpoint color video 200. In the case of the sub-block 620, the motion vector borrowing unit 130 may borrow a motion vector from the block 250.

By performing the above process with respect to the entire blocks of the second viewpoint color video 300, it is possible to decrease redundant motion vector calculation during a multi-view color video encoding process.

In the aforementioned example embodiments, pre-calculated motion vectors of blocks within the first viewpoint color video 200 are borrowed to determine a block motion vector within the second viewpoint color video 300.

The pre-calculated motion vectors of blocks within the first viewpoint color video 200 may also be borrowed to determine a block motion vector within the first viewpoint depth video. This process will be described with reference to FIG. 7.

Figure 7:
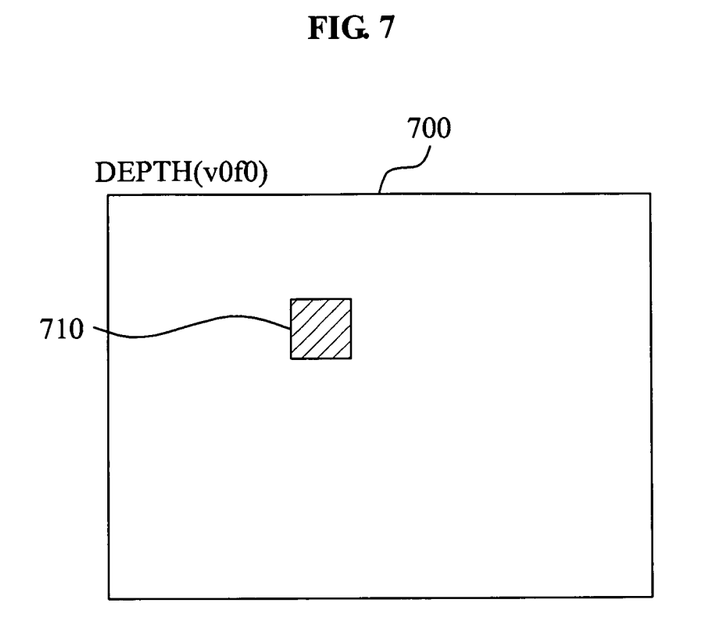
FIG. 7 illustrates a first viewpoint depth video to borrow a block motion vector from a first viewpoint color video according to example embodiments.

FIG. 7 illustrates a first viewpoint depth video 700 to borrow a block motion vector from a first viewpoint color video 200 according to example embodiments.

Figure 11:
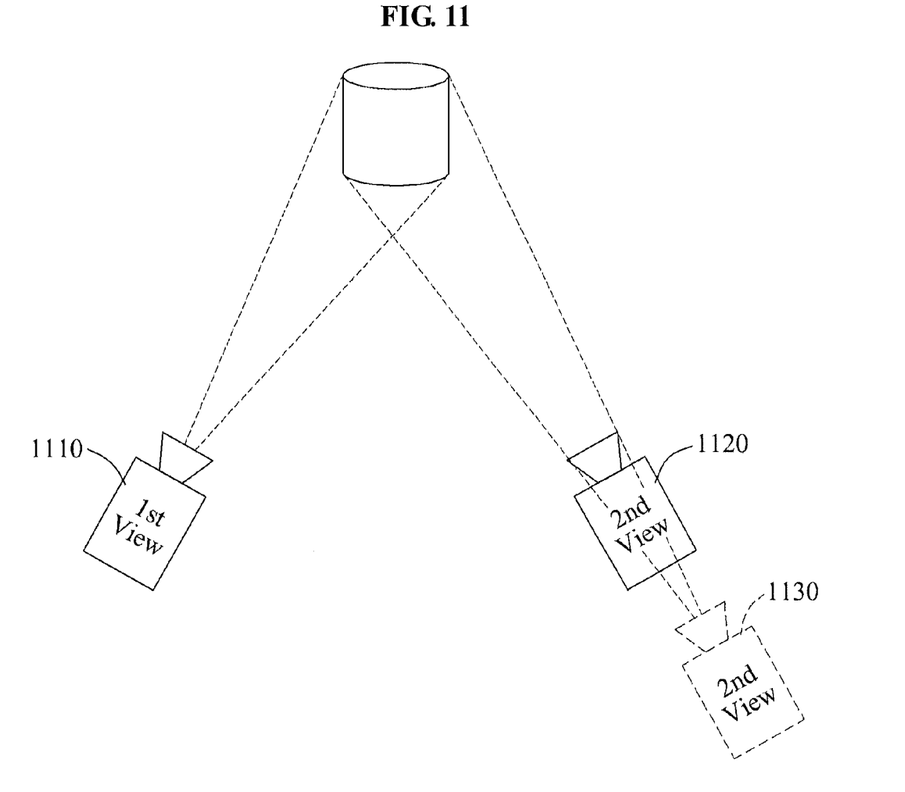
FIG. 11 illustrates a first color camera obtaining a color video at a first viewpoint, a second color camera obtaining a color video at a second viewpoint, and a depth camera obtaining a depth video at the second viewpoint according to example embodiments.
Figure 12:
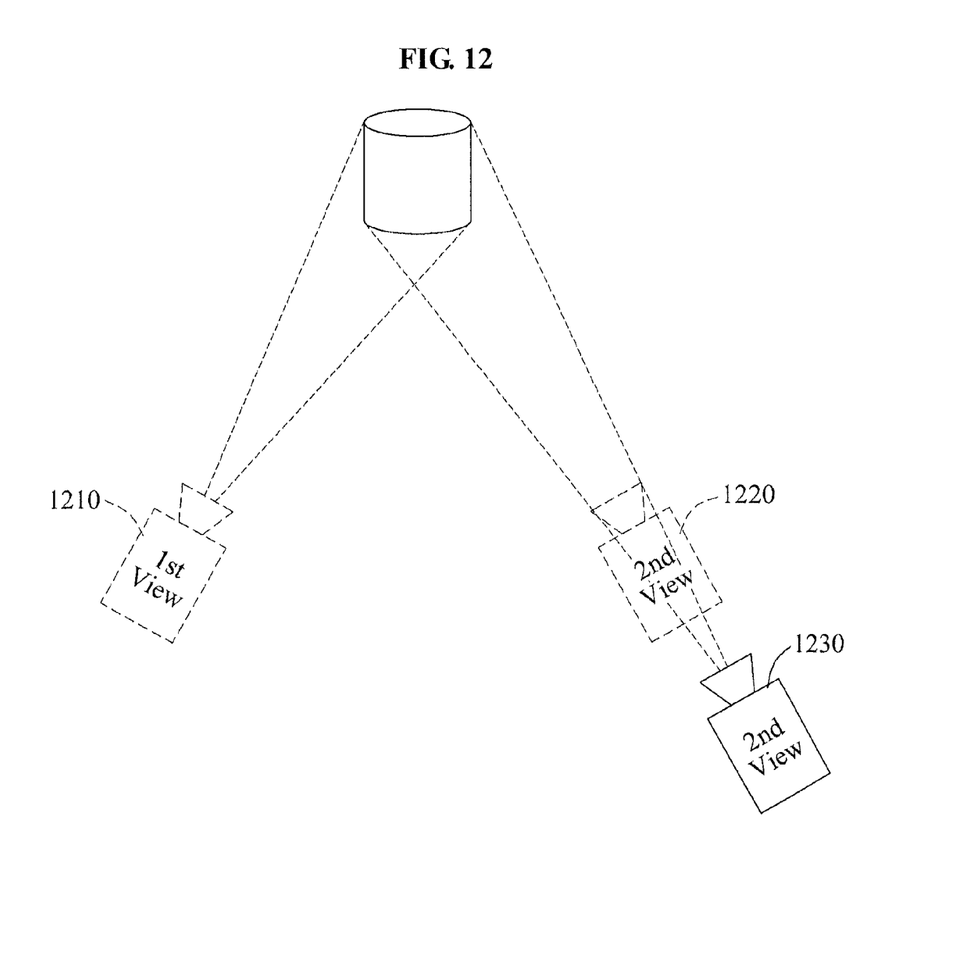
FIG. 12 illustrates a first depth camera obtaining a depth video at a first viewpoint, a second depth camera obtaining a depth video at a second viewpoint, and a color camera obtaining a color video at the second viewpoint according to example embodiments.

The first viewpoint depth video 700 may have the same resolution as a resolution of the first viewpoint color video 200, or may have a resolution different from the resolution of the first viewpoint color video 200 due to a difference in hardware specifications. Generally, a depth camera or a depth sensor may have a resolution less than a resolution of a color camera or a color sensor As another example, FIG. 11 illustrates a first color camera 1110 obtaining a color video at a first viewpoint, a second color camera 1120 obtaining a color video at a second viewpoint, and a depth camera 1130 obtaining a depth video at the second viewpoint, according to example embodiments. Referring to FIG. 11, the depth camera 1130 obtaining a depth video at the second viewpoint may have a resolution less than a resolution of color camera 1110 or color camera 1120 and therefore the second viewpoint depth video may have a lower resolution than the resolution of the first viewpoint color video obtained by color camera 1110 and a lower resolution than the resolution of the second viewpoint color video obtained by color camera 1120, due to a difference in hardware specifications. As yet another example, FIG. 12 illustrates a first depth camera 1210 obtaining a depth video at a first viewpoint, a second depth camera 1220 obtaining a depth video at a second viewpoint, and a color camera 1230 obtaining a color video at the second viewpoint according to example embodiments. The resolution between the first depth camera 1210 and the second depth camera 1220 may be different than the resolution of the color camera 1230.

Hereinafter, example embodiments where the resolution of the first viewpoint depth video 700 is less than the resolution of the first viewpoint color video 200 will be described. However, this is only an example and thus is not limited thereto.

Accordingly, example embodiments may be applicable to a case where the resolution of the first viewpoint depth video 700 is greater than or equal to the resolution of the first viewpoint color video 200.

A process of borrowing a motion vector calculated with respect to the plurality of blocks of the first viewpoint color video 200 when determining a motion vector with respect to a second block 710 of the first viewpoint depth video 700 will be described with reference to FIGS. 8 and 9.

Figure 8:
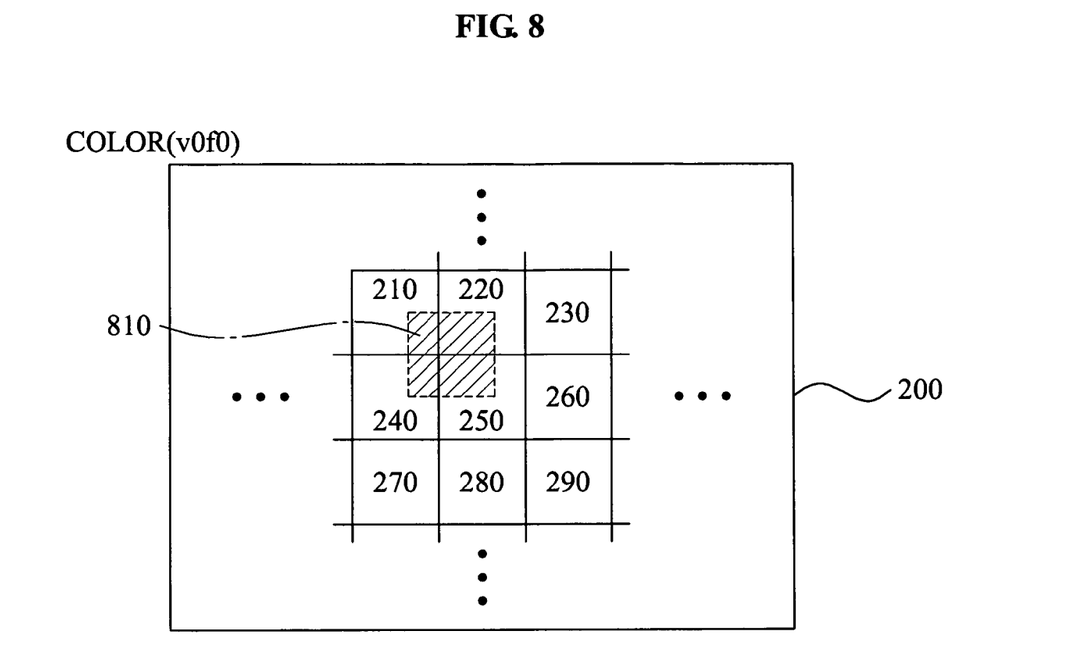
FIG. 8 illustrates a process of determining a block from which a motion vector is to be borrowed according to example embodiments.

FIG. 8 illustrates a process of determining a block from which a motion vector is to be borrowed according to example embodiments.

Referring to FIG. 8, a second area 810 corresponding to the second block 710 of the first viewpoint depth video 700 is indicated on the first viewpoint color video 200.

Since a resolution of the first viewpoint color video 200 is greater than a resolution of the first viewpoint depth video 700, a size of the second area 810 may become larger than a size of the second block 710. Accordingly, the second area 810 may be included in a plurality of blocks, for example, blocks 210, 220, 240, and 250 within the first viewpoint color video 200.

In this case, a process of borrowing, as a motion vector of the second block 710 of the first viewpoint depth video 700, a motion vector pre-calculated with respect to each of the blocks 210, 220, 240, and 250 may be similar to the process described above with reference to FIGS. 5 and 6.

Figure 9:
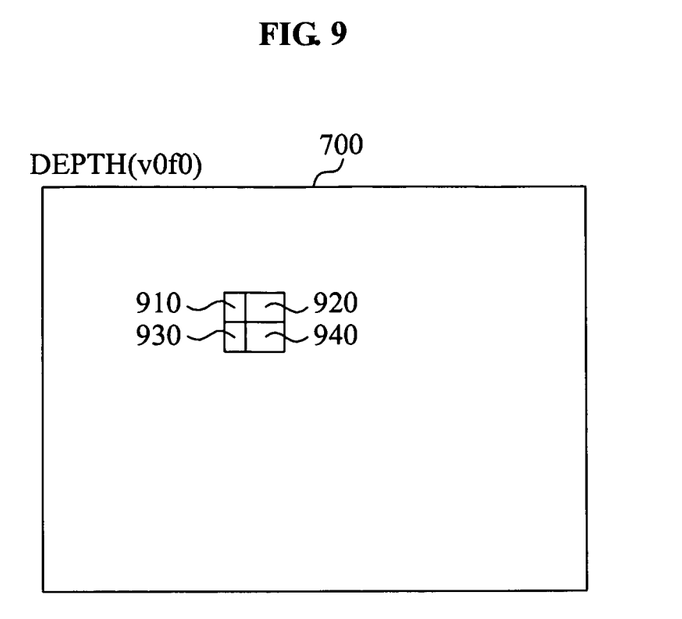
FIG. 9 illustrates a block within a first viewpoint depth video divided into a plurality of sub-blocks according to example embodiments.

FIG. 9 illustrates a block within a first viewpoint depth video 700 divided into a plurality of sub-blocks according to example embodiments.

The motion vector borrowing unit 130 may divide the second block 710 of the first viewpoint depth video 700 into a plurality of sub-blocks, for example, sub-blocks 910, 920, 930, and 940.

In the case of the sub-block 910, the motion vector borrowing unit 130 may borrow a pre-calculated motion vector from the block 210 of the first viewpoint color video 200. In the case of the sub-block 920, the motion vector borrowing unit 130 may borrow a pre-calculated motion vector from the block 220. In the case of the sub-block 930, the motion vector borrowing unit 130 may borrow a pre-calculated motion vector from the block 230. In the case of the sub-block 940, the motion vector borrowing unit 130 may borrow a pre-calculated motion vector from the block 240.

When the above application is expanded, motion vectors calculated with respect to blocks of the first viewpoint depth video 700 or motion vectors determined by the borrowing operation may also be borrowed with respect to blocks of a second viewpoint depth video (not shown).

In this case, the disparity calculator 120 may calculate a disparity vector between the first viewpoint and the second viewpoint using a depth value with respect to a particular block within the second viewpoint depth video.

An area corresponding to the particular block may be determined within the first viewpoint depth video 200 using the disparity vector. A motion vector of at least one block including at least one portion of the determined area may be borrowed as a motion vector of the particular block.

In this case, a sub-block division may be performed as described above with reference to FIGS. 8 and 9.

Figure 10:
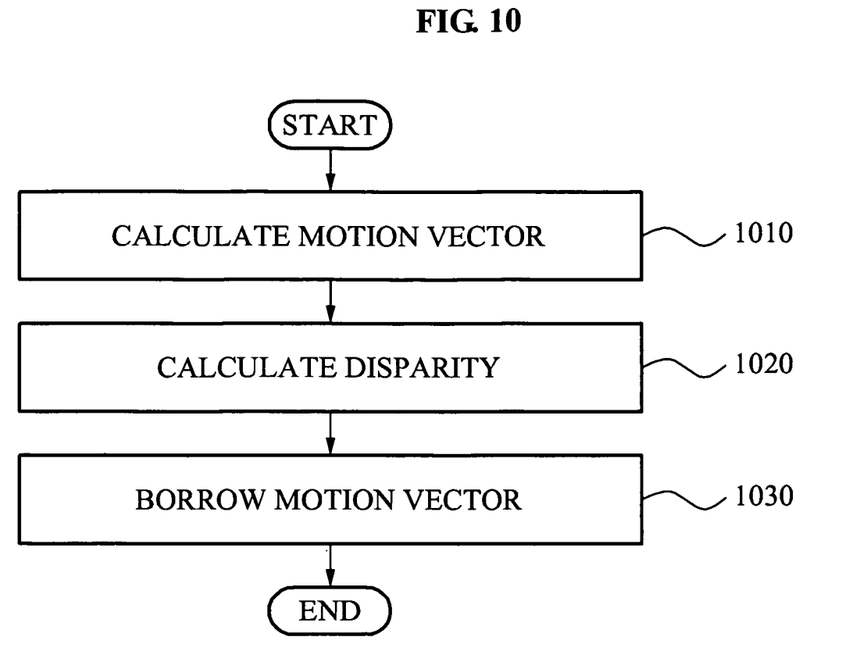
FIG. 10 illustrates an image processing method according to example embodiments.

FIG. 10 illustrates an image processing method according to example embodiments.

In operation 1010, the motion vector calculator 110 may calculate a motion vector with respect to each of the plurality of blocks of the first viewpoint color video 200. The motion vector calculation may be performed using general encoding schemes.

However, the motion vector calculated with respect to the blocks of the first viewpoint color video 200 may be borrowed as a motion vector of the first block 310 of the second viewpoint color video 300.

In this case, the disparity calculator 120 may obtain a depth value of the first block 310 from a depth video, and calculate a disparity between a first viewpoint and a second viewpoint using the depth value in operation 1020.

In operation 1030, the motion vector borrowing unit 130 may determine a first area corresponding to the first block 310 within the first viewpoint color video 200 by applying the calculated disparity.

The motion vector borrowing unit 130 may determine at least one block including at least one portion of the first area among the plurality of blocks of the first viewpoint color video.

The motion vector calculation result with respect to the determined at least one block may be borrowed as the motion vector of the first block 310.

As described above, a sub-block division may be performed and different motion vectors may be borrowed with respect to divided sub-blocks, as described above with reference to FIGS. 5 and 6.

A process of borrowing, as a motion vector of the first viewpoint depth video 700, a motion vector calculation result with respect to the blocks of the first viewpoint color video 200 is described above with reference to FIGS. 7 through 9.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter.

The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An image processing apparatus encoding a multi-view depth video, the apparatus comprising:
    a motion vector calculator to calculate a motion vector of each of a plurality of blocks within a depth video of a first viewpoint;
    a disparity calculator to obtain a color video of a first block of a second viewpoint and to calculate a disparity vector between the first viewpoint and a first block of the second viewpoint within a depth video of the second viewpoint, by referring to the color video of the first block of the second viewpoint, wherein a camera used to obtain the color video is different than a camera used to obtain the depth video of the first viewpoint and a camera used to obtain the depth video of the second viewpoint; and
    a motion vector borrowing unit to borrow, as a motion vector of the first block within the depth video of the second viewpoint, a motion vector of at least one block among the plurality of blocks within the depth video of the first viewpoint, by referring to the disparity vector.

2. An image processing method of encoding a multi-view depth video, the method comprising:
    calculating, by at least one processor, a motion vector of each of a plurality of blocks within a depth video of a first viewpoint;
    obtaining a color video of a first block of a second viewpoint and calculating, by the at least one processor, a disparity vector between the first viewpoint and a first block of the second viewpoint within a depth video of the second viewpoint, by referring to the color video of the first block of the second viewpoint, wherein a camera used to obtain the color video is different than a camera used to obtain the depth video of the first viewpoint and a camera used to obtain the depth video of the second viewpoint; and
    borrowing by the at least one processor, as a motion vector of the first block within the depth video of the second viewpoint, a motion vector of at least one block among the plurality of blocks within the depth video of the first viewpoint, by referring to the disparity vector.

3. At least one non-transitory computer-readable medium encoded with computer readable instructions to implement an image processing method comprising:
    calculating a motion vector of each of a plurality of blocks within a depth video of a first viewpoint;
    obtaining a color video of a first block of a second viewpoint and calculating a disparity vector between the first viewpoint and a first block of the second viewpoint within a depth video of the second viewpoint, by referring to the color video of the first block of the second viewpoint, wherein a camera used to obtain the color video is different than a camera used to obtain the depth video of the first viewpoint and a camera used to obtain the depth video of the second viewpoint; and
    borrowing as a motion vector of the first block within the depth video of the second viewpoint, a motion vector of at least one block among the plurality of blocks within the depth video of the first viewpoint, by referring to the disparity vector.

* * * * *

UNITED STATES PATENT AND TRADEMARK OFFICE
CERTIFICATE OF CORRECTION

PATENT NO.       : 9,225,967 B2                     Page 1 of 1
APPLICATION NO.  : 12/929413
DATED            : December 29, 2015
INVENTOR(S)      : Kwang Hoon Sohn et al.

It is certified that error appears in the above-identified patent and that said Letters Patent is hereby corrected as shown below:

Title Page

Item 75, Inventors, Page 1, Column 1, Line 4:
Delete "Namyanglu" and insert -- Namyangju --, therefor.

Signed and Sealed this
Twenty-fourth Day of May, 2016

Michelle K. Lee
*Director of the United States Patent and Trademark Office*